(12) United States Patent
Bittner

(10) Patent No.: US 11,140,890 B2
(45) Date of Patent: Oct. 12, 2021

(54) AGRICULTURAL VEHICLE HAVING AN IMPROVED APPLICATION BOOM WITH A COMPOSITE TUBE

(71) Applicant: CNH Industrial America LLC, New Holland, PA (US)

(72) Inventor: Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 107 days.

(21) Appl. No.: 16/546,840

(22) Filed: Aug. 21, 2019

(65) Prior Publication Data
US 2021/0051941 A1     Feb. 25, 2021

(51) Int. Cl.
| | | |
|---|---|---|
| *A01M 7/00* | (2006.01) | |
| *A01C 23/04* | (2006.01) | |
| *B05B 15/62* | (2018.01) | |
| *B05B 1/20* | (2006.01) | |
| *A01M 21/04* | (2006.01) | |

(52) U.S. Cl.
CPC ......... *A01M 7/0075* (2013.01); *A01C 23/047* (2013.01); *A01M 21/043* (2013.01); *B05B 1/20* (2013.01); *B05B 15/62* (2018.02)

(58) Field of Classification Search
CPC . A01M 7/0075; A01M 21/043; A01C 23/047; B05B 1/20; B05B 15/14; B05B 15/18; B05B 15/62
See application file for complete search history.

(56) References Cited

U.S. PATENT DOCUMENTS

| | | |
|---|---|---|
| 3,116,760 A | 1/1964 | Matthews |
| 5,988,702 A | 11/1999 | Sas-Jaworsky |
| 6,234,543 B1 | 5/2001 | Logan et al. |
| 6,405,762 B1 | 6/2002 | Bunch |
| 7,243,686 B2 | 7/2007 | Burke et al. |
| 9,162,774 B2 | 10/2015 | Minteer et al. |
| 9,163,757 B2 | 10/2015 | Papon et al. |
| 9,759,355 B2 | 9/2017 | Daugherty et al. |
| 2008/0110519 A1 | 5/2008 | Gorilovskiy et al. |
| 2013/0263963 A1 | 10/2013 | Kalman et al. |
| 2013/0299034 A1 | 11/2013 | Sundholm |

(Continued)

FOREIGN PATENT DOCUMENTS

EP        0611911 A1    8/1994

OTHER PUBLICATIONS

Reliable Pipes & Tubes LTD.; "Full Encirclement Steel Sleeve"; dated Dec. 31, 2017; http://www.halfpipesleeve.com/full-encirclement-steel-sleeve-html—(19) pages.

*Primary Examiner* — Darren W Gorman
(74) *Attorney, Agent, or Firm* — Rebecca L. Henkel; Rickard K. DeMille

(57) ABSTRACT

An agricultural vehicle includes a chassis, wheels supporting the chassis for moving the vehicle, an application system supported by the chassis and including a product tank storing a volume of agricultural product for delivery onto an agricultural field, and an application boom configured to deliver the agricultural product to the agricultural field. The application boom includes a composite tube, and a sleeve surrounding the composite tube to support the composite tube at a stress point of the composite tube.

14 Claims, 8 Drawing Sheets

(56) References Cited

U.S. PATENT DOCUMENTS

| | | | | |
|---|---|---|---|---|
| 2016/0037764 A1* | 2/2016 | DePriest | ............ | A01M 7/0075 |
| | | | | 248/70 |
| 2017/0000103 A1* | 1/2017 | Wissler | ............... | A01M 7/0071 |
| 2017/0086449 A1* | 3/2017 | Hiddema | ............ | A01M 7/0075 |
| 2018/0266613 A1 | 9/2018 | Walker et al. | | |
| 2018/0283425 A1 | 10/2018 | Bernard | | |
| 2019/0357519 A1* | 11/2019 | Castro | ..................... | B05B 15/62 |

* cited by examiner

AGRICULTURAL VEHICLE HAVING AN IMPROVED APPLICATION BOOM WITH A COMPOSITE TUBE

FIELD OF THE INVENTION

The invention relates generally to agricultural machines having agricultural product application equipment and, in particular, to an agricultural vehicle including an improved application boom having a composite tube, such as a carbon fiber tube.

BACKGROUND OF THE INVENTION

Various types of agricultural vehicles (e.g., sprayers, floaters, applicators, collectively referred to herein as applicators) are employed to deliver fertilizer, pesticides, herbicides, or other products to the surface of a field. Such agricultural vehicles typically include an application boom configured to facilitate product delivery over wide swaths of soil. As will be appreciated, longer booms cover wider swaths of soil. As booms get larger, alternate structural materials to metal become more attractive, due to the altering relationships between costs, weight, and stress characteristics. Composite materials, like carbon fiber (CF), can carry distributed loads well, but are often challenged by stress concentrations at points of fixation. A weak point of a CF tube may delaminate or buckle under bending or compressive loads. Particularly weak points occur at the joining of the CF material to another material, say an aluminum casting used to contain a hinge in the boom assembly.

SUMMARY OF THE INVENTION

According to aspects of the invention, material is added to an exterior of a composite tube to reinforce the area that tends to delaminate or buckle. In some aspects, the material is added circumferentially around the tube forming a sleeve. The sleeve is designed to address tangential loading.

According to an aspect of the invention, a ferrule reinforces a composite tube loaded in compression or bending. The ferrule is placed where the loads may cause the composite to fail by delamination or buckling. An internal support may be necessary to counter the ferrule stress if the ferrule is preloaded. The use of the ferrule may reduce the overall weight of the composite tube, and therefore the cost of an assembly, by reducing the number of layers of composite required since the ferrule addresses some tangential loading on the composite tube.

According to one aspect of the invention, an agricultural vehicle includes a chassis, wheels supporting the chassis for moving the vehicle, an application system supported by the chassis and including a product tank storing a volume of agricultural product for delivery onto an agricultural field, and an application boom configured to deliver the agricultural product to the agricultural field. The application boom includes a composite tube, and a sleeve surrounding the composite tube to support the composite tube at a stress point of the composite tube.

According to another aspect of the invention, an agricultural vehicle includes a chassis, wheels supporting the chassis for moving the vehicle, an application system supported by the chassis and including a product tank storing a volume of agricultural product for delivery onto an agricultural field, an application boom configured to deliver the agricultural product to the agricultural field, and a lift arm arrangement that connects the application boom to the chassis and is configured to raise and lower the application boom. The application boom includes a boom center section. The application boom also includes a first boom arm and a second boom arm, both of which being supported by the boom center section. Each of the first boom arm and second boom arm includes, respectively, a truss system having a longitudinal carbon fiber tube with an end. The longitudinal carbon fiber tube has an inner cross section and an exterior surface. The inner cross section is elliptical or oval shape. Each of the first boom aim and second boom arm further includes, respectively, a cast metal member coupled with the longitudinal carbon fiber tube. Each of the cast metal members includes an exterior cross section being contiguous with the inner cross section of the respective longitudinal carbon fiber tube. Each of the cast metal members further includes a ridge extending past the exterior surface of the respective longitudinal carbon fiber tube. Each ridge is contiguous with the end of the respective longitudinal carbon fiber tube. Each of the first boom arm and second boom arm further includes, respectively, a metallic ferrule fastening the respective cast metal member to the respective longitudinal carbon fiber tube. Each of the metallic ferrules is disposed at the end of the respective longitudinal composite tube and surrounds the end of the respective longitudinal composite tube. Each of the metallic ferrules includes a groove to receive a portion of the ridge of the respective cast metal member.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
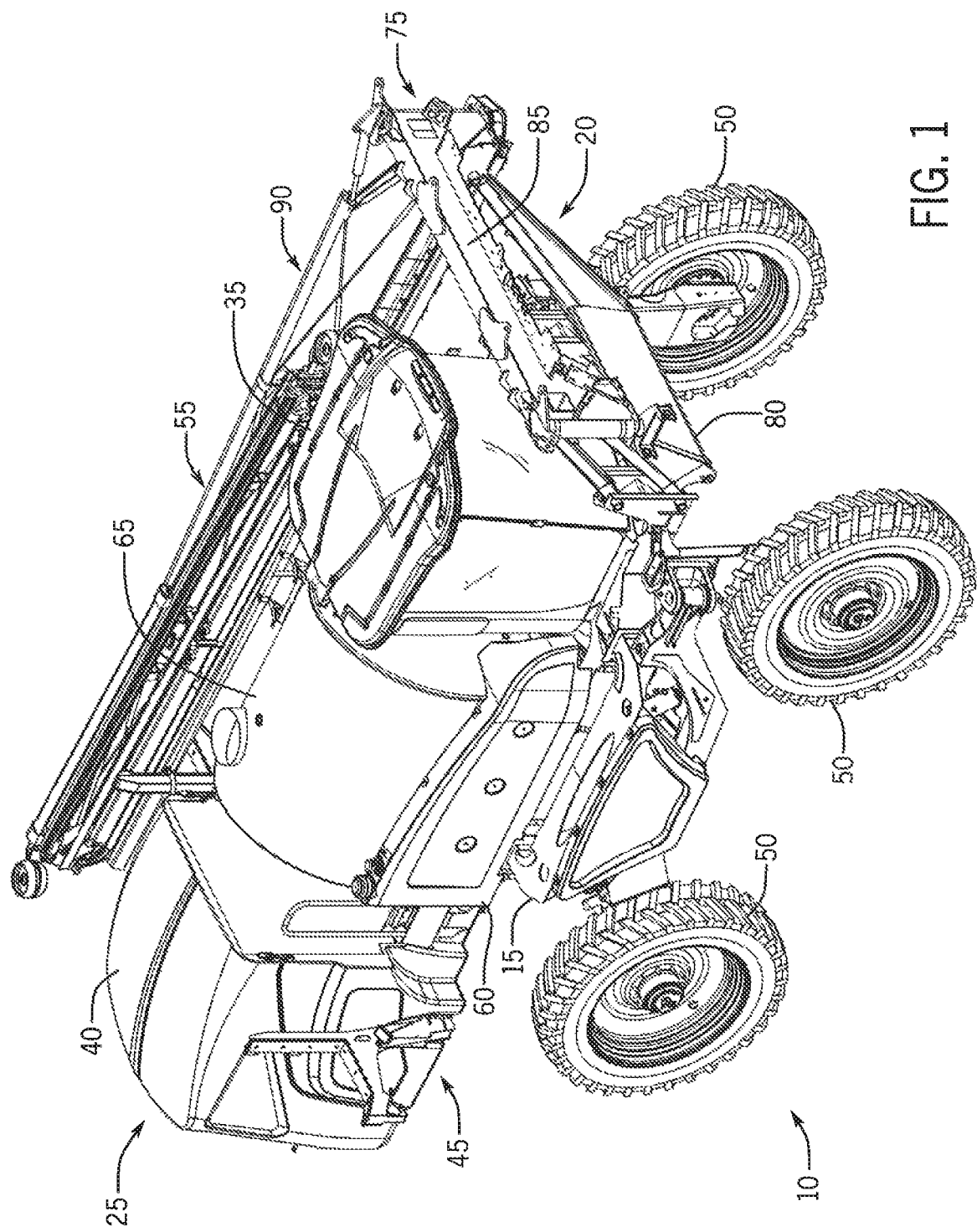
FIG. 1 is an isometric view of a front-boom sprayer from a first perspective, where the boom is in a raised position, and a left boom arm is in a retracted position.

Referring now to the drawings and specifically to FIGS. 1-4, aspects of the invention are shown for use with an agricultural vehicle, which is shown in the figures to be an agricultural sprayer vehicle (referred to herein as simply "sprayer") 10. The sprayer 10 is shown as a front-boom sprayer, such as those available from CNH Industrial, including the Miller Nitro sprayers and New Holland Guardian Series sprayers. Other arrangements for the sprayer 10 are contemplated, including a rear-mounted configuration boom sprayer, such as those available from CNH Industrial, including the Miller Condor Series sprayers and New Holland Guardian Series rear-boom sprayers. Moreover, other agriculture machines and vehicles incorporating aspects of the invention are contemplated, including agriculture vehicles having a boom.

The sprayer 10 includes a frame or chassis 15 having front and back ends 20 and 25, respectively. The chassis 15 provides structural support for various assemblies, systems, and components of the sprayer 10. These various assemblies, systems, and components can include an operator cab 35 in a forward position toward the front end 20 of the chassis 15. An engine 40 and a hydraulic system 45 are shown in a rearward position toward the back end 25 of the chassis 15. The hydraulic system 45 receives power from the engine 40 and includes at least one hydraulic pump which can be in a hydrostat arrangement. The hydraulic pump(s) provide hydraulic pressure for operating hydraulic components within the hydraulic system 45. For sprayers with hydrostatic drives, hydraulic motors are operably connected to the hydraulic pump(s) for rotating wheels 50 of the sprayer 10. In mechanical drive applications, a mechanical transmission receives power from the engine 40 and delivers power for rotating the wheels 50 by way of power-transmitting driveline components. Example power-transmitting driveline components include drive shafts, differentials, and other gear sets in portal, drop boxes, or other housings.

A spray-application system 55 is supported by the chassis 15. The spray application system 55 includes storage containers, such as a rinse tank 60 for storing water or a rinsing solution and a product tank 65 for storing a volume of product for delivery onto an agricultural field with the sprayer 10. The product includes any of a variety of agricultural liquid products, such as various pesticides, herbicides, fungicides, liquid fertilizers, and other liquids including liquid suspensions beneficial for application onto agricultural fields. A product delivery pump can convey product from the product tank 65 through plumbing components (e.g., interconnected pieces of tubing) and through a boom tubing system. The boom tubing system releases the product out of spray nozzles that are spaced from each other along the width of an application boom (simply referred to as boom 75 herein) during spraying operations of the sprayer 10. Groups or banks of multiple adjacent spray nozzles define multiple spray segments of the spray system. Spray segments are defined along the boom 75 and selectively deliver product for release onto an agricultural field at locations corresponding to positions of activated spray segments.

Figure 2:
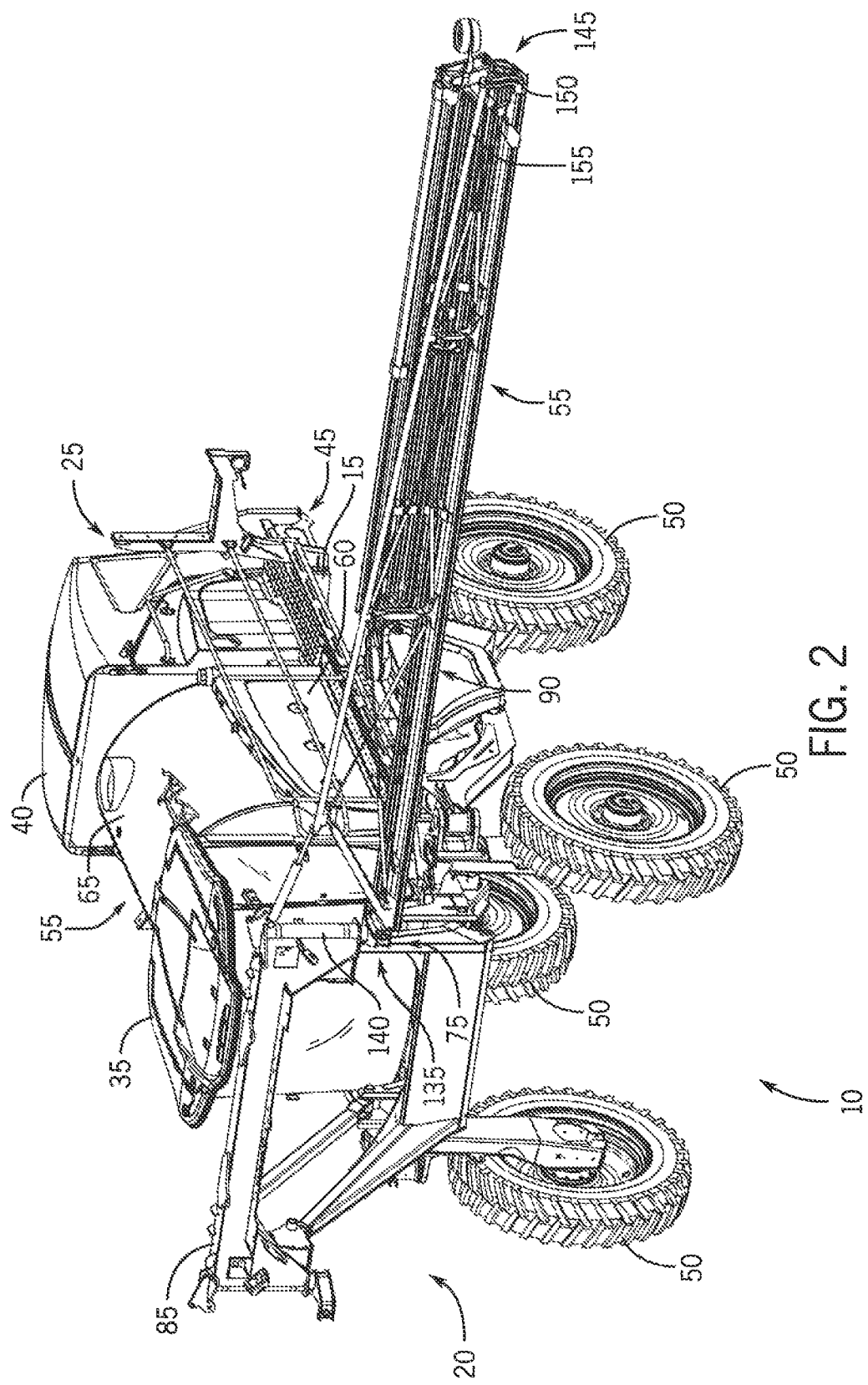
FIG. 2 is an isometric view from a second perspective of the front-boom sprayer of FIG. 1, where the boom is in a raised position, the right boom arm is removed, a first boom arm segment of the left boom arm is in an extended positioned, and second and third boom arm segments of the left boom arm are in the retracted position.

The boom 75 is connected to the chassis 15 with a lift arm arrangement or assembly 80. The lift arm assembly 80 is attached to a boom center section 85. The lift arm assembly 80 is configured to move the boom 75 up and down for adjusting the height of application of the product and/or to raise the boom 75 above objects (e.g., agricultural product). FIGS. 1 and 2 show the boom in a raised position, and FIGS. 3 and 4 show the boom in a lowered position.

Coupled to the boom center section 85, the boom 75 has multiple interconnected segments that collectively define each of a left and right boom arm, respectively. Left and right for the boom 75 are defined with respect to an operator's view of the boom 75 from the operator cab 35. Left and right boom arms extend in opposite directions from the boom center section 85. The left and right boom arms are mirror identical about a longitudinal axis of the sprayer 10, and thus, only left boom arm 90 is shown and described in further detail. For simplicity, FIGS. 1-4 show the right boom arm removed. FIG. 1 shows the left boom arm 90 in a retracted, or transport, position. FIGS. 2-4 show the left boom arm 90 in an extended position.

The left boom arm 90 has multiple segments, including first, second, and third boom arm segments 100, 105, and 110 (FIG. 4), respectively. The number of boom arm segments can vary among sprayer designs. Collectively, the boom center section 85, the left boom arm 90, and the right boom arm define the boom 75, which has left and right ends, respectively. The boom 75 has an inner facing side 125 that faces toward the operator cab 35 and provides a vehicle mounting surface(s) with mounting structures configured for mounting the boom 75 to the lift arm assembly 80. Opposite the inner facing side 125 is an outer facing or outward side 130 of the boom 75 that faces away from the operator cab 35.

Figure 3:
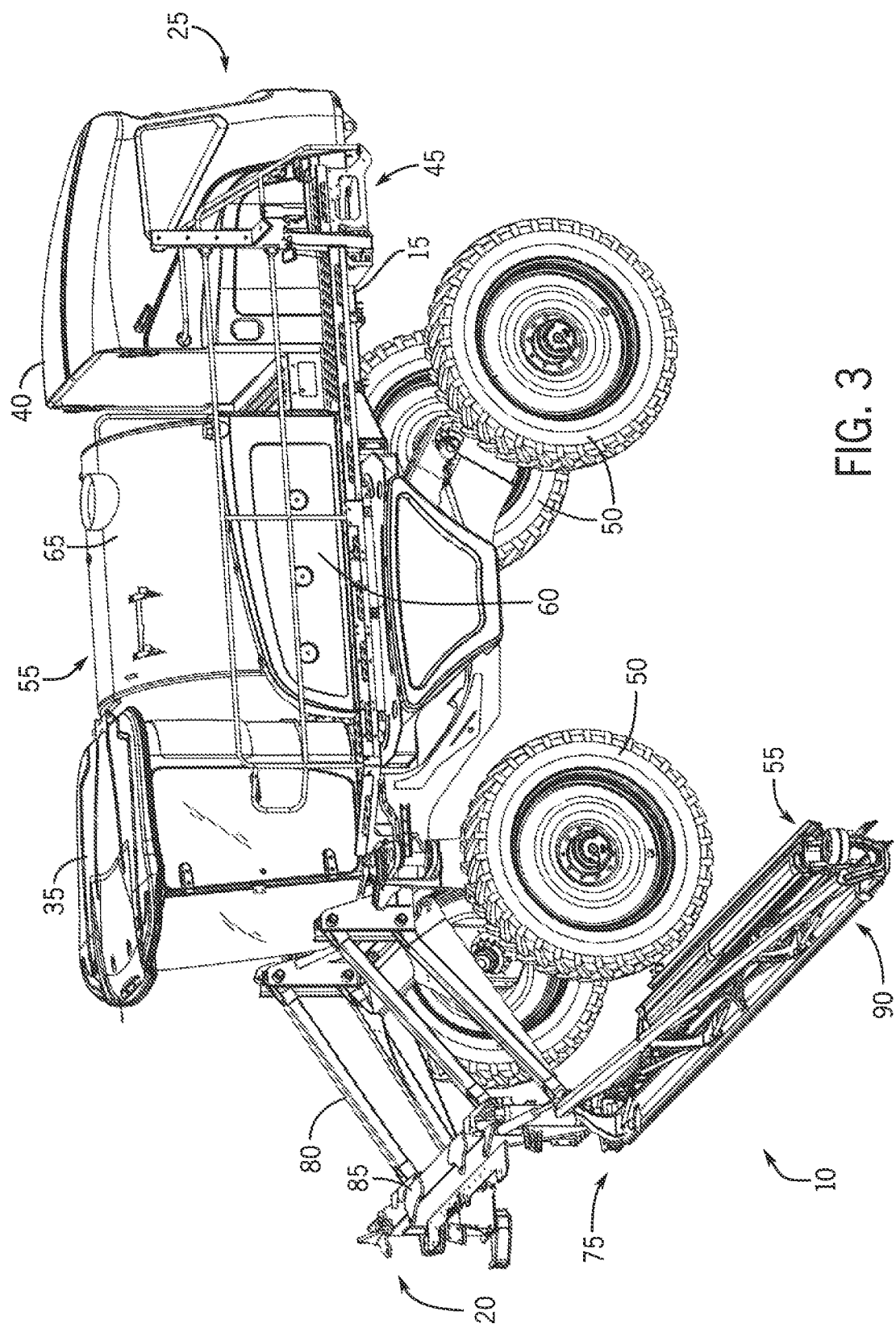
FIG. 3 is an isometric view from the second perspective of the front-boom sprayer of FIG. 1, where the boom is in a lowered position, the right boom arm is removed, the first boom arm segment of the left boom arm is in the extended positioned, and the second and third boom arm segments of the left boom arm are in the retracted position.
Figure 4:
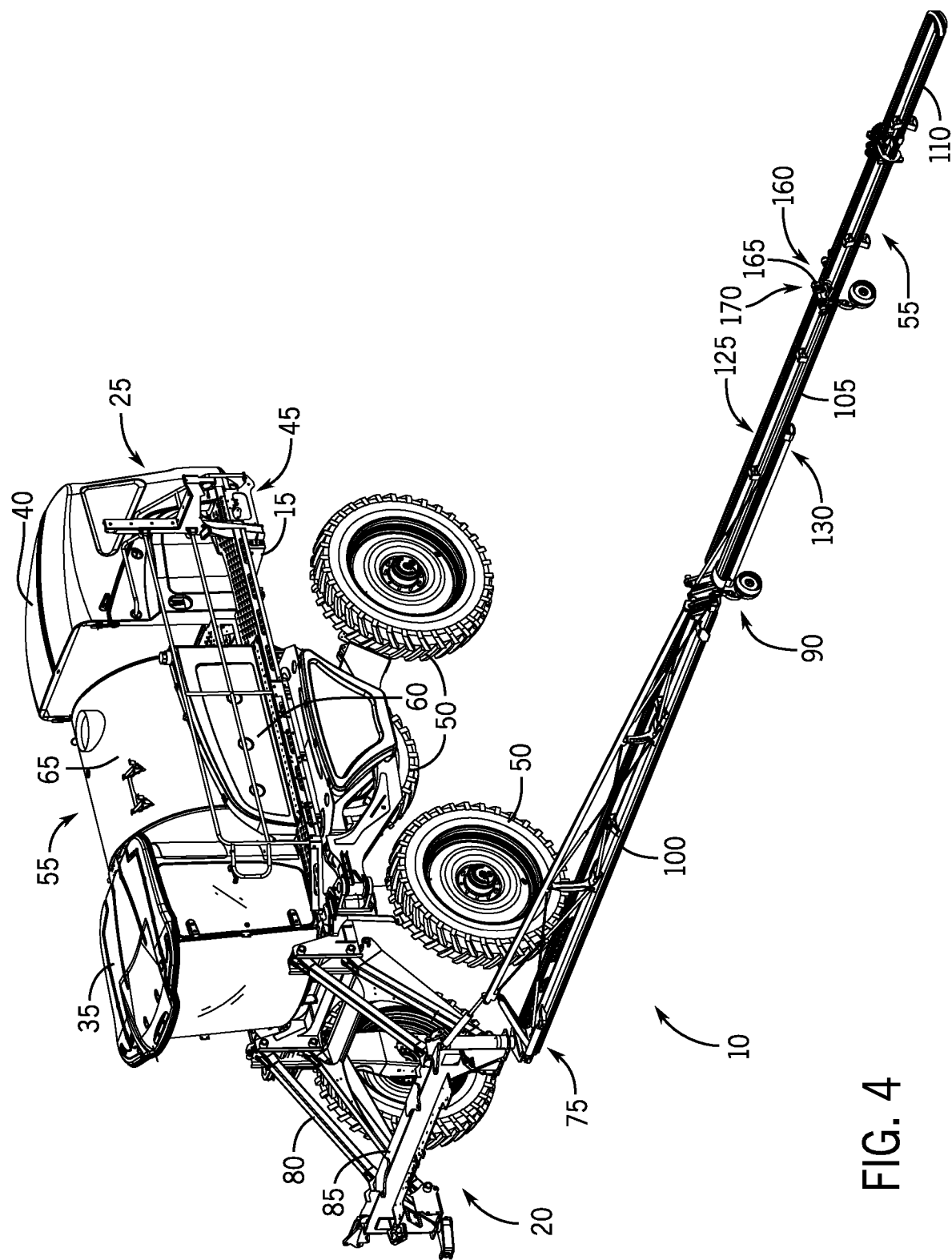
FIG. 4 is an isometric view from the second perspective of the front-boom sprayer of FIG. 1, where the boom is in the lowered position, the right boom arm is removed, and the left boom arm is in a fully extended position.

FIGS. 2 and 3 show the left boom arm 90 in a first extended, spray position, where only the first segment 100 of the left boom arm 90 is extended. Moreover, FIG. 2 shows the left boom arm 90 at a first spray height and FIG. 3 shows the left boom arm at a second spray height. FIG. 4 shows the left boom arm in a second extended, spray position, where all of the first, second, and third segments 100-110 are extended. The boom center segment and/or the first, second, and third boom arm segments 100-110 are configured with actuators to allow the left boom arm 90 to fold and extend as necessary for operation.

With reference to FIG. 2, the first boom arm segment 100 has an inner end 135 that is connected with hinge 140 to the boom center section 85. The hinge 140 is configured to allow for generally forward/rearward horizontal pivoting of the first boom arm segment 100, and consequently second and third boom arm segments 105 and 110, away/toward the chassis 15 when pivoting the first boom arm segment 100.

The second boom arm segment 105 has an inner end 145 that is connected with hinge 150 to the outer end 155 of the first boom arm segment 100. The hinge 150 is configured to allow for generally rotating the second boom arm segment 105, and consequently third boom arm segment 110, away/toward the first boom arm segment 100 when pivoting the second boom arm segment 105.

With reference to FIG. 4, the third boom arm segment 110 has an inner end 160 that is connected with hinge 165 to the outer end 170 of the second boom arm segment 105. The hinge 165 is configured to allow for rotational pivoting of the third boom arm segment 110 away/toward the second boom arm segment 105 when pivoting the third boom arm segment 110.

Figure 5:
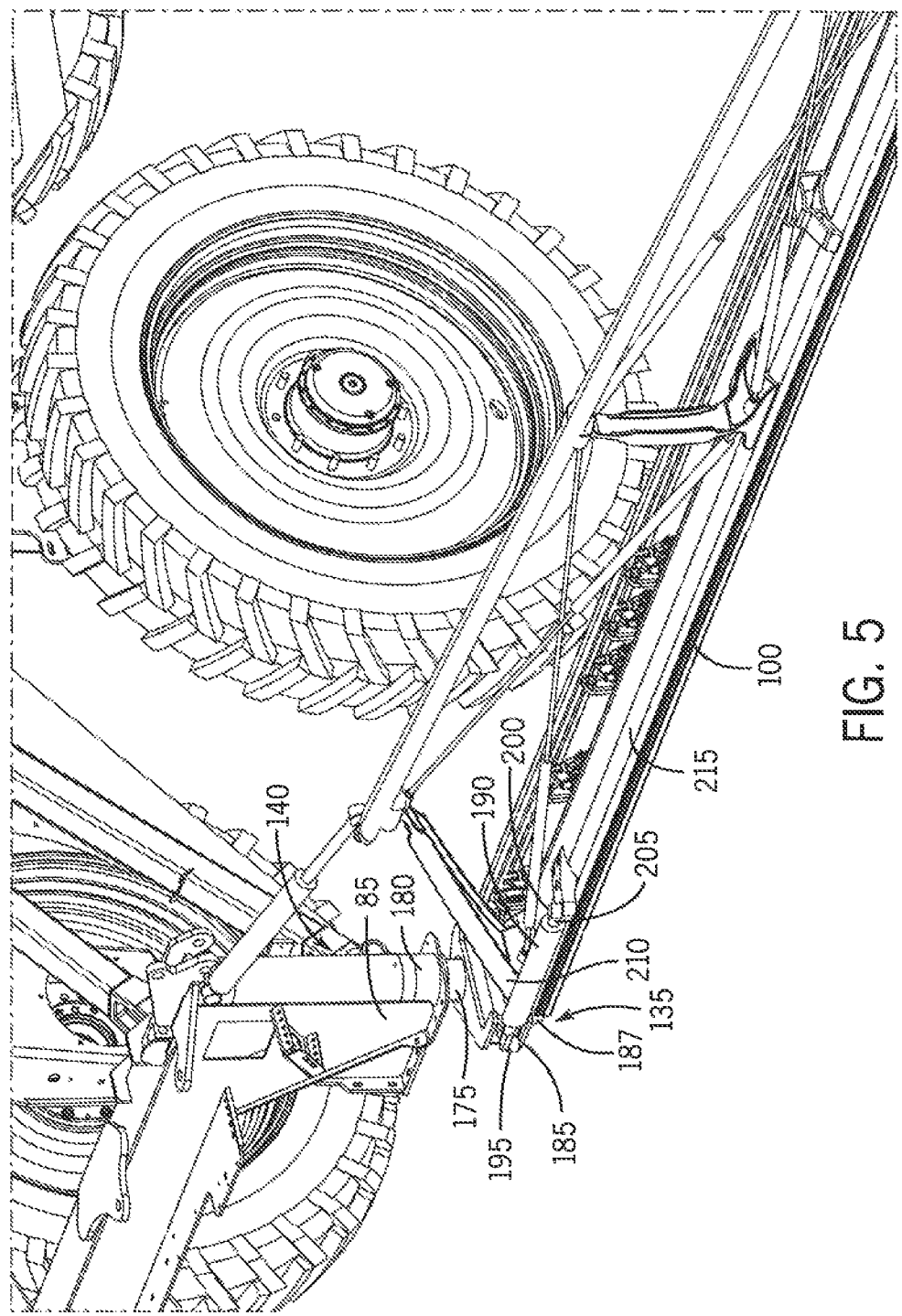
FIG. 5 is an enlarged isometric view of a portion of the left boom arm of FIG. 4 according to some aspects of the present invention.

FIG. 5 is an enlarged view of the first boom arm segment 100 coupling with the boom center section 85 via the hinge 140. The hinge 140 is shown as having a pin 175 disposed within a sleeve 180. The sleeve 180 is fixedly coupled with the boom center section 85 and the pin is fixedly coupled with the first boom arm segment 100 by hinge connector 185 and hinge connector 187. The pin 175 pivots within the sleeve 180 in response to one or more actuators (actuator 190 is shown) actuating. The actuators can be electrical, hydraulic, and/or pneumatic. A first end 195 of the actuator 190 is fixed to the hinge connector 185 and a second end 200 is fixed to the first boom arm 100. The arrangement shown in FIG. 5 shows a piston rod 205 of the actuator 190 retracted in a cylinder 210 of the actuator 190, thereby promoting the extended position of the first boom segment 100. When the first boom segment 100 is retracted, the piston rod 205 is extended from the cylinder 210.

The first boom arm segment 100 has a truss arrangement (best seen in FIG. 4). Included with the truss arrangement is a longitudinal tube 215, which is one example of a tube in the truss arrangement. FIG. 4 shows the left boom arm having many longitudinal tubes. Aspects of the invention are discussed in connection with the tube 215 but can be used in many other tube arrangements.

Figure 6:
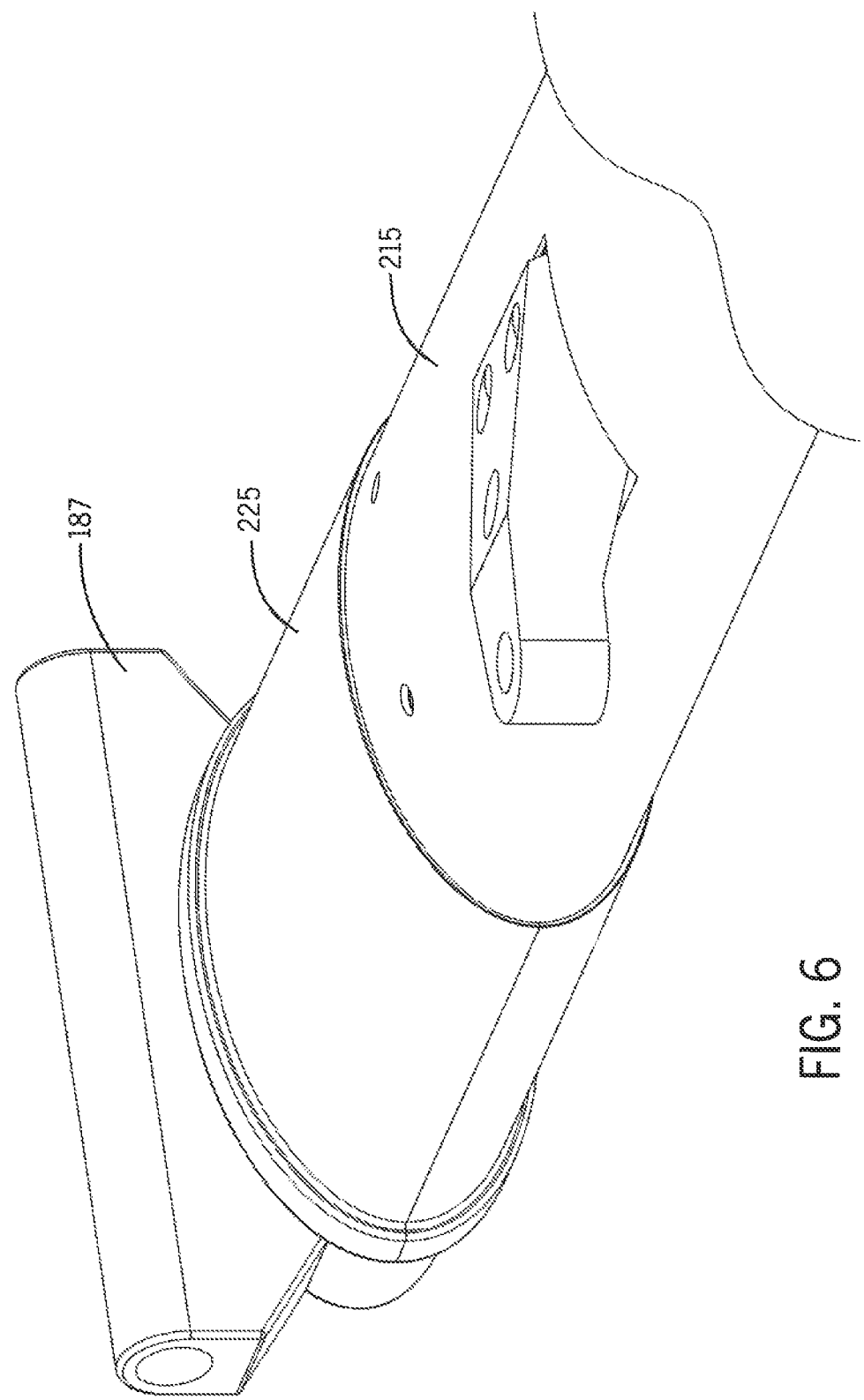
FIG. 6 is the enlarged isometric view of FIG. 5 showing only a portion of the left boom arm of FIG. 5.

FIG. 6 shows an enlarged view of a portion of the truss in FIG. 5. More specifically, FIG. 6 shows the longitudinal tube 215, hinge connector 187, and ferrule 225. As application booms get larger, alternate structural materials to metal (e.g., steel) become more attractive, due to the altering relationships between costs, weight, and stress characteristics. Composite materials like carbon fiber (CF), fiberglass, ceramic matrix composites, etc. can carry distributed loads well. Also as shown in FIG. 6, the longitudinal tube 215 has an elliptical or oblong cross section, but can have a circular cross section.

Figure 7:
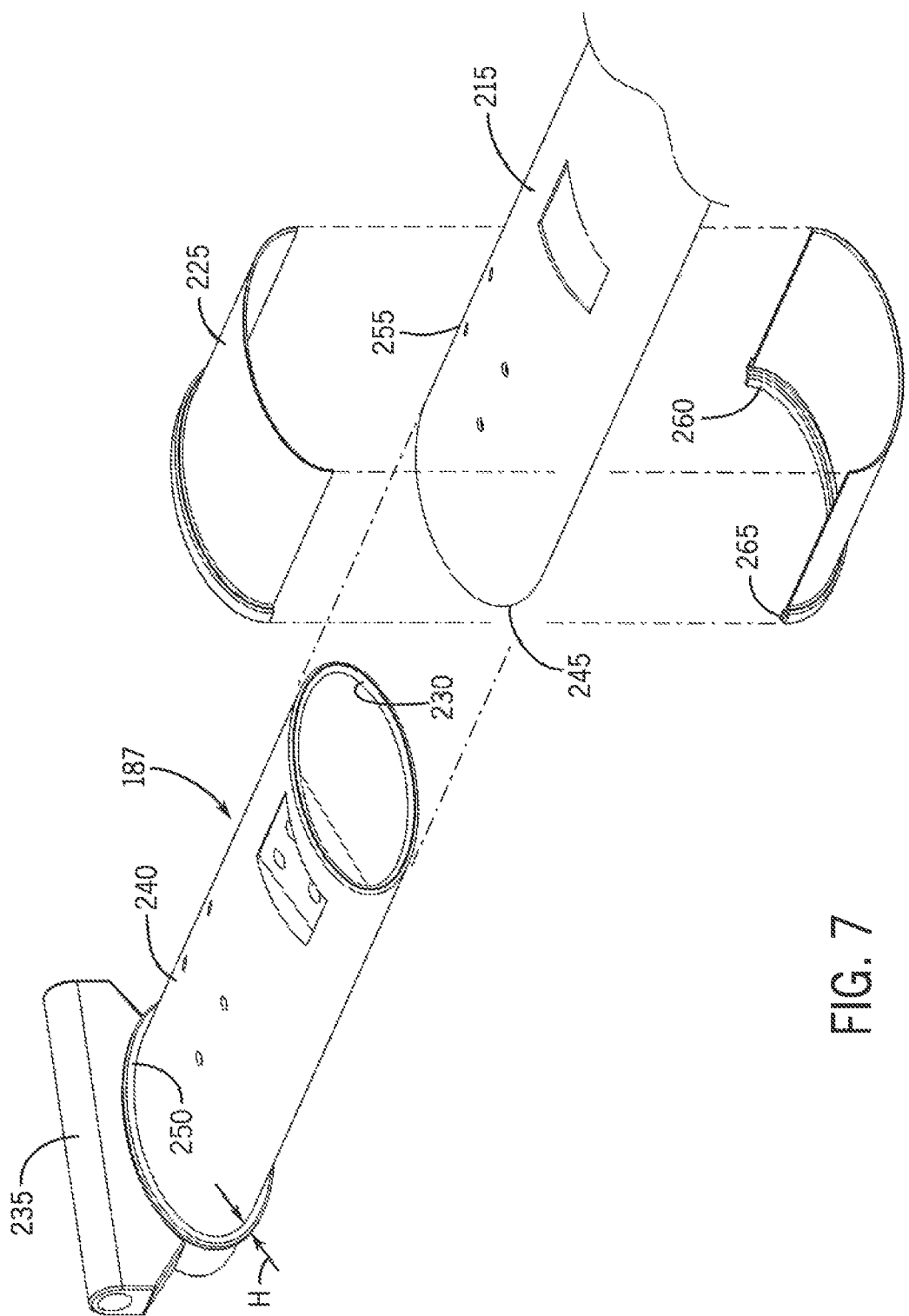
FIG. 7 is an exploded, assembly view of the portion of the left boom arm of FIG. 6.

The hinge connector 187 couples the longitudinal tube 215 to the hinge connector 185. The hinge connector 187 can be a metal material such as cast aluminum, and can be used to help contain the hinge 165 in the sprayer boom assembly. With reference to FIG. 7, the hinge connector 187 includes a tube 230 and a pin sleeve portion 235 integrated with the tube 230. The tube 230 is shown in FIG. 7 as being hollow, however the tube 230 can be filled with a material or be solid. The exterior 240 shape of the tube 230 conforms to the inner 245 shape of the longitudinal tribe 215, allowing a portion of the tube 230 of the connector 187 to be inserted into and disposed within the longitudinal tube 215. In some constructions, the longitudinal tube 215 frictionally engages the connector 220, however other fastening techniques are possible. The connector further includes a ridge 250. The ridge 250, among other things, provides a stop for when tube 230 is inserted into the longitudinal tube 215 (see FIG. 8). The ridge 250 has a height, H (see FIG. 7), greater than the exterior 255 of the longitudinal tube 215 (see FIG. 8).

Composite materials are often challenged by stress concentrations at points of fixation. A problem with CF tubes, such as the longitudinal tube 215, is that they may delaminate or buckle under bending or compressive loads. CF tubes are most vulnerable when joining to another material, such as the aluminum cast connector 220. The ferrule 225 reinforces the longitudinal tube 215 loaded in compression or bending. The use of the ferrule 225 can reduce the overall weight of the longitudinal tube 215, and therefore the cost of truss assembly, by reducing the number of layers of composite required for the longitudinal tube 215 since the ferrule addresses some tangential loading on the longitudinal tube 215.

Figure 8:
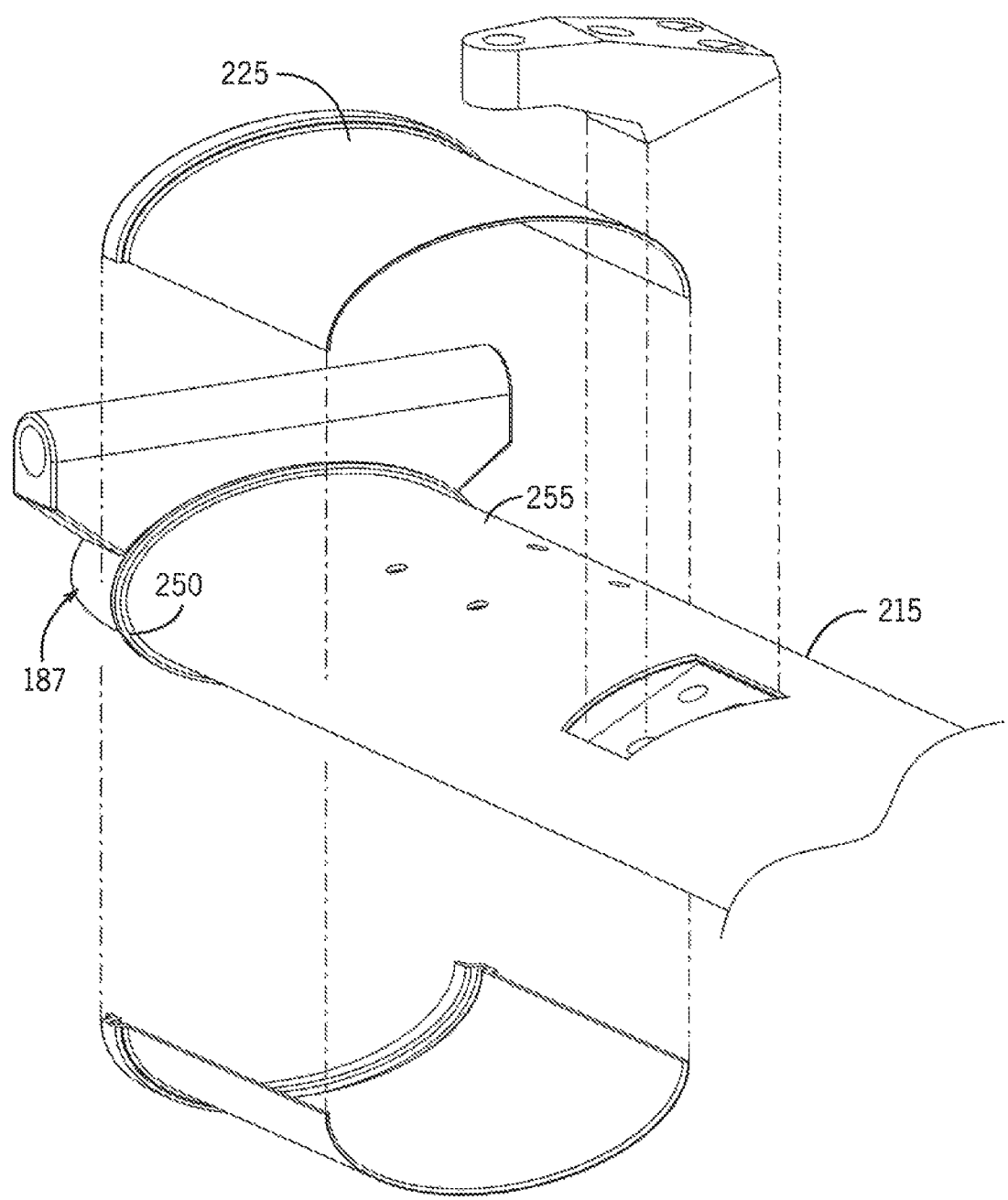
FIG. 8 is a partial exploded, assembly view of the portion of the left boom arm of FIG. 6.

The ferrule 225 can be a metallic material such as aluminum or steel. The ferrule 225 can be either bonded, clamped, or press fit to the longitudinal tube 215. The ferrule could be one piece, multiple pieces, or split to facilitate assembly. The ferrule 225 is shown in FIGS. 7 and 8 as being 2 pieces that press fit around the longitudinal tube 215. CF layers of the tube 215 are sandwiched between layers of other material as part of transitions from that tubular shape to another.

The tube 230 disposed within the connector 220 provides an internal support for the longitudinal tube 215. The internal support helps to counter the stress provided by the ferrule 225, such as if the ferrule 225 is preloaded. The ferrule 225 shown in FIGS. 7 and 8 as having a groove 260 and a lip 265. The groove 260 houses the ridge 250 when the ferrule is fixedly secured around the longitudinal tube 215.

While the ferrule 225 is shown in FIGS. 7 and 8 as being placed at the end of the longitudinal tube 215, the ferrule 225, such as a sleeve, can be placed at other locations where the loads may cause the composite to fail by delamination or buckling. Also, it is contemplated that the sleeve may have different designs from the ferrule 225 shown in FIGS. 7 and 8.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

I claim:

1. An agricultural vehicle comprising:
a chassis,
wheels supporting the chassis for moving the agricultural vehicle;
an application system supported by the chassis and including a product tank storing a volume of agricultural product for delivery onto an agricultural field;
an application boom configured to deliver the agricultural product to the agricultural field, the application boom including:
a boom center section;
a boom arm pivotably coupled to the boom center section, the boom arm including a composite tube having an end;
a non-composite member coupled with the composite tube at the end of the composite tube; and
a ferrule surrounding the end of the composite tube and fastening the non-composite member to the composite tube;
wherein the non-composite member couples the boom arm to the boom center section.

2. The agricultural vehicle of claim 1, wherein the application boom further includes a second boom arm having;
a second composite tube having an end;
a second non-composite member coupling the second boom arm to the boom center section; and
a second ferrule surrounding the end of the second composite tube, the second ferrule fastening the second non-composite member to the second composite tube.

3. The agricultural vehicle of claim 1, wherein the composite tube has an exterior surface, wherein the ferrule has an interior surface, and wherein the interior surface of the ferrule is contiguous with the exterior surface of the composite tube.

4. The agricultural vehicle of claim 1, wherein the composite tube is a carbon fiber tube.

5. An agricultural vehicle comprising:
a chassis;
wheels supporting the chassis for moving the vehicle;
an application system supported by the chassis and including a product tank storing a volume of agricultural product for delivery onto an agricultural field;
an application boom configured to deliver the agricultural product to the agricultural field, the application boom including:
  a boom center section; and
  a first boom arm supported by the boom center section, the first boom arm including:
    a longitudinal composite tube with an end;
    a non-composite member coupled with the longitudinal composite tube at the end of the longitudinal composite tube; and
    a ferrule fastening the non-composite member to the longitudinal composite tube, the ferrule being disposed at the end of the longitudinal composite tube,
wherein:
the non-composite member further includes a ridge being contiguous with the end of the longitudinal composite tube;
the ridge extends beyond an exterior surface of the longitudinal composite tube; and
the ferrule includes a groove to receive a portion of the ridge of the non-composite member.

6. The agricultural vehicle of claim 5, wherein the longitudinal composite tube is a carbon fiber tube.

7. The agricultural vehicle of claim 5, wherein the non-composite member is a cast metallic member.

8. The agricultural vehicle of claim 7, wherein the cast metallic member couples the first boom arm and to the boom center section.

9. The agricultural vehicle of claim 5, wherein the longitudinal composite tube has an inner cross section and an exterior surface, wherein the non-composite member includes an exterior cross section being contiguous with the inner cross section of the longitudinal composite tube.

10. The agricultural vehicle of claim 9, wherein the exterior surface is an elliptical or oval shape, and wherein the inner cross section is an elliptical or oval shape.

11. The agricultural vehicle of claim 5, wherein the ferrule includes a metallic ferrule having multiple pieces.

12. The agricultural vehicle of claim 5, wherein the ferrule surrounds the end of the longitudinal composite tube.

13. The agricultural vehicle of claim 5, and further comprising a lift arm arrangement that connects the boom center section to the chassis and that is configured to raise and lower the boom.

14. An agricultural vehicle comprising:
a chassis;
wheels supporting the chassis for moving the agricultural vehicle;
an application system supported by the chassis and including a product tank storing a volume of agricultural product for delivery onto an agricultural field;
an application boom configured to deliver the agricultural product to the agricultural field, the application boom including:
  a boom center section;
  a first boom arm and a second boom arm, both of which being supported by the boom center section, each of the first boom arm and second boom arm including, respectively;
    a truss system having a longitudinal carbon fiber tube with an end, the longitudinal carbon fiber tube having an inner cross section and an exterior surface, the inner cross section being an elliptical or oval shape;
    a cast metal member coupled with the longitudinal carbon fiber tube, the cast metal member including an exterior cross section being contiguous with the inner cross section of the longitudinal carbon fiber tube, the cast metal member further including a ridge extending beyond the exterior surface of the longitudinal carbon fiber tube and being contiguous with the end of the longitudinal carbon fiber tubed; and
    a metallic ferrule fastening the cast metal member to the longitudinal carbon fiber tube, the metallic ferrule being disposed at the end of the longitudinal composite tube and surrounding the end of the longitudinal carbon fiber tube, the metallic ferrule including a groove to receive a portion of the ridge of the cast metal member; and
a lift arm arrangement connecting the application boom to the chassis and that is configured to raise and lower the application boom.

* * * * *